Figure 1:
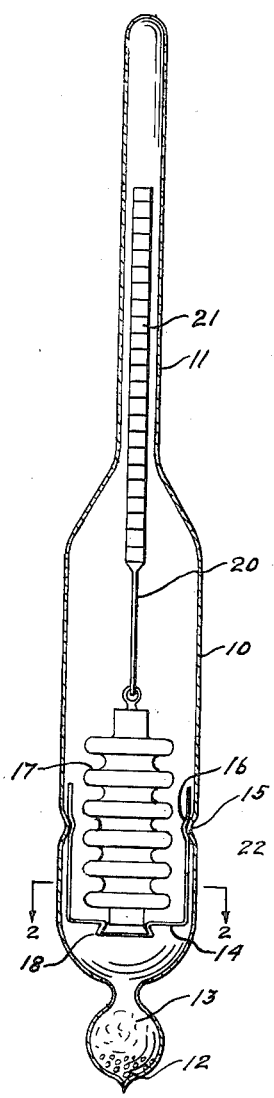

Jan. 2, 1940.   C. E. LINEBARGER   2,185,205
HYDROMETER
Filed Jan. 9, 1937   2 Sheets-Sheet 1

INVENTOR
CHARLES E. LINEBARGER
BY E. J. Andrews
ATTY.

Jan. 2, 1940.　　　　　C. E. LINEBARGER　　　　2,185,205
　　　　　　　　　　　　HYDROMETER
　　　　　　　　　Filed Jan. 9, 1937　　　2 Sheets-Sheet 2

INVENTOR
CHARLES E. LINEBARGER
BY E. J. Andrews
ATTY.

Patented Jan. 2, 1940

2,185,205

UNITED STATES PATENT OFFICE 2,185,205

HYDROMETER

Charles E. Linebarger, Chicago, Ill., assignor to The Chaslyn Company, Chicago, Ill., a corporation of Illinois Application January 9, 1937, Serial No. 119,735

8 Claims. (Cl. 265—45)

This invention relates to hydrometers, and particularly to hydrometers which are designed to very accurately indicate the density of the liquid involved independently of temperature changes. In my copending patent application, Serial No. 55,765, filed December 23, 1935, I have described some uses of thermostats applied to the rotating element of hydrometric vanes for the purpose of correcting their density readings for changes of temperature. In the present application there are given additional means to bring about such corrections, incorporated not only in the movable vane or hand or dial, but also in the scale sheet, such, and other means, being also applicable to different kinds of hydrometers, as, for instance, constant weight float hydrometers.

One object of my present invention is to provide apparatus mounted within the bulb or barrel of a constant weight float hydrometer by means of which the scale sheet is shifted to and fro so as to bring its readings in accord with those corrected for temperature variations.

A second object of my invention is to fit thermostatic means to hydrometer vanes whereby the scale sheets are rotated to change the density indications, when the liquids under test are heated, by amounts commensurate with their changes in density owing to the changes in temperature.

A third object is to introduce mechanical means into a hydrometric assembly between the scale and the thermostat, so as to convert the uniform thermostatic motion into an irregular motion designed to match the irregular change in density of a liquid owing to its change in temperature.

Other objects of the invention will be apparent from a consideration of the drawings herewith and the descriptions thereof. In carrying out these objects I make use of thermostatic devices such as bellows.

By filling a thermostatic bellows with the same liquid as is to be tested for density, and using the bellows for correcting the readings of the hydrometer, irregularities of expansion of the liquid at different temperatures are thereby automatically corrected in the hydrometer readings, particularly if mechanical means are employed to magnify the slight motion of the bellows.

In general, any mechanical device which can change a substantially uniform motion into a motion having a more or less gradual acceleration or deceleration in the same or in the opposite direction may be employed to coact with a thermostat in a hydrometer to correct its readings for temperature changes. Among such devices may be mentioned gears, levers, links, lazy tongs, racks and pinions, face cams, and so forth, as being preferred means for making such temperature changes.

Figure 2:
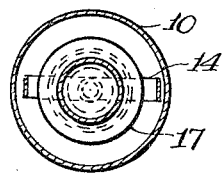
Figure 9:
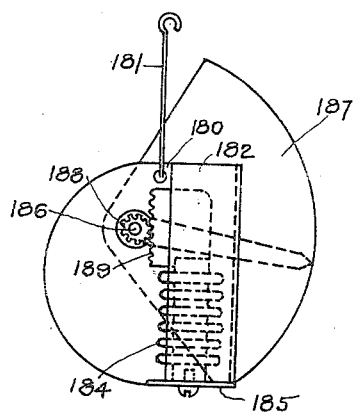
Figure 10:
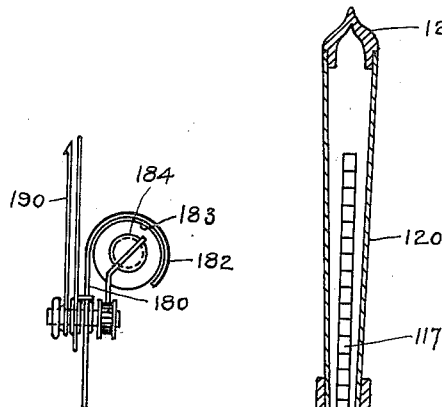
Figure 8:
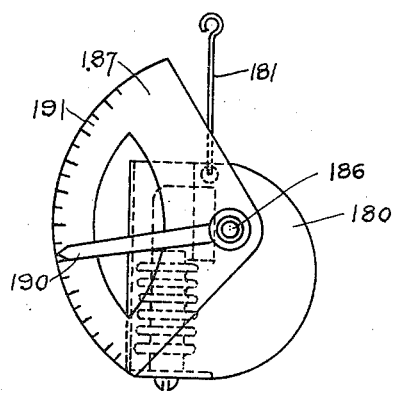

Of the accompanying drawings, Fig. 1 is an elevation of a constant weight hydrometer which embodies some of the features of my invention; Fig. 2 is a sectional view thereof along the line 2—2 of Fig. 1; Figs. 3 to 6 illustrate by similar drawings modifications of the hydrometer illustrated by Fig. 1; Fig. 7 illustrates a modification of the hydrometer shown in Fig. 1 but including a correcting element for irregularities of expansion of the liquid with temperature changes; Figs. 8 to 10 show a modified type of hydrometer which is to be entirely suspended in the liquid under test, and which comprises a scale sheet and a pointer which are relatively movable.

Fig. 1 illustrates a hydrometer of the constant weight barrel or bulb type. This comprises a glass tube or barrel 10 with an elongated stem or neck 11, which is completely sealed and encloses in its lower end any suitable ballast, such as the shot 12. In this case the shot is preferably held in place by means of the cotton wadding 13. Within the tube is mounted a support 14 which is held in position by any suitable means such as the depressions 15 in the glass wall. These depressions coact with corresponding depressions 16 in the support. The drawings are more or less diagrammatical, and it is to be understood that these depressions and the stiffness of the support, consisting of elastic metal or other material, are sufficient to clamp the support rigidly in place in the tube under all conditions.

Mounted on the support is a bellows 17, which, in this instance, is firmly held by the support by means of the projection 18. This bellows, as is well known, is composed of flexible material which, if it contains a suitable fluid, will expand and contract as its temperature increases or decreases. In this case it is desirable to have the bellows filled with liquid whose coefficient of expansion is the same as that of the liquid to be tested, such as the electrolyte of a storage battery. As this is frequently not possible, the liquid chosen should be as nearly as possible similar in its expansibility to that of the various liquids to be tested. The bellows itself should be chosen to meet the particular needs to which the hydrometer is to be put.

Mounted upon the bellows is a link 20, preferably, is pivoted by its lower end to the bellows. The upper end of the link supports a scale strip 21 which has scale divisions thereon suitable for indicating, in an ordinary manner, the density of the liquid, by the liquid level of the liquid under test. The scale strip is slidably mounted in the stem, and it may be made flat or triangular, or square in cross section, or otherwise, as may be desired, and it may be of any suitable material.

In operation, the weight and size of the hydrometer, and the position of the scale are such as to indicate correctly the density of the liquid at ordinary or normal temperatures. As the temperature rises above normal, the liquid will become less dense, and the hydrometer will sink accordingly. Without compensating for this, the readings would be incorrect; but as the temperature rises the temperature of the liquid in the bellows will rise accordingly; this will expand the bellows and will thus raise the scale 21 so as to indicate the correct density, or substantially so.

Any slight error that may arise from the expansion of the link 20 may be offset by the expansion of the arms 22 of the support, the material and the lengths of the link and the arms being properly arranged for.

Figure 3:
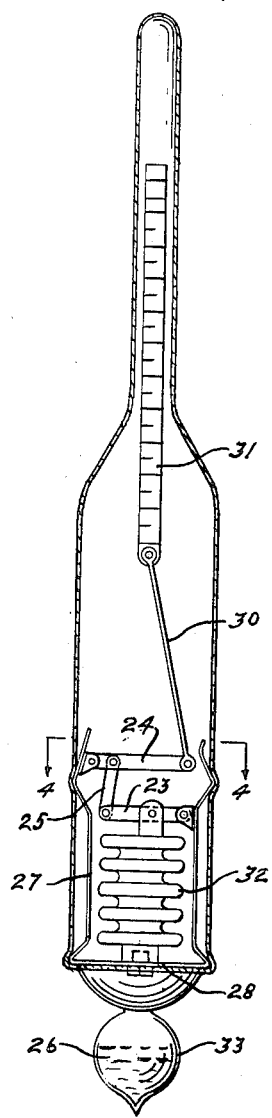
Figure 4:
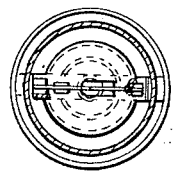

Figs. 3 and 4 illustrate a modification in which means are used to magnify the expansion effects of the bellows. These means comprise a combination of a plurality of levers, two being shown in Fig. 3. The bellows 32 is joined, preferably soldered, to the lower part of the support or clamp 28, at opposite sides of the upper part of which are pivoted connections with the levers 23 and 24 connected by the link 25. The upper end of the bellows is pivoted on the lever 23, and a link 30 is pivoted to the free end of the lever 24 and the other end of the link is pivoted to the lower end of the scale 31.

The support is suspended by the arms 27, or fixed in the tube in any suitable manner. In this case the ballast indicated is mercury 26 contained in the sealed bulb 33. It is to be understood that the amount of the mercury or other ballast is such as to cause the hydrometer to sink in the liquid to be tested to the proper amount. Ordinarily the hydrometer should sink in the liquid, when it is at the normal temperature so that the indication of the density will be substantially at the central portion of the scale. But if the range in temperature above or below normal is much greater than the respective range below or above, the normal reading is arranged for accordingly by the amount of the ballast.

The scales to be used may be varied as desired, and the sheets on which the scales are formed may be of any suitable material and shape. They may be flat with a scale on each side, the scales being unlike and designed for any standard density scales, or special scales may be used. They may be of triangular cross section or square cross section, with a scale on each face if desired.

Figure 5:
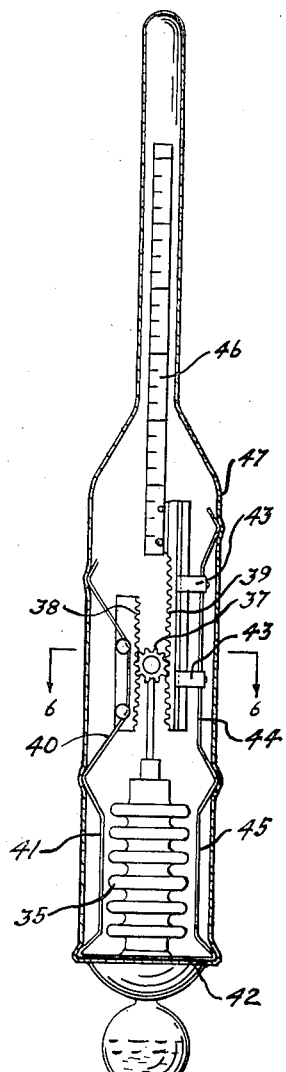
Figure 6:
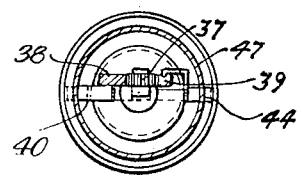
Figure 7:
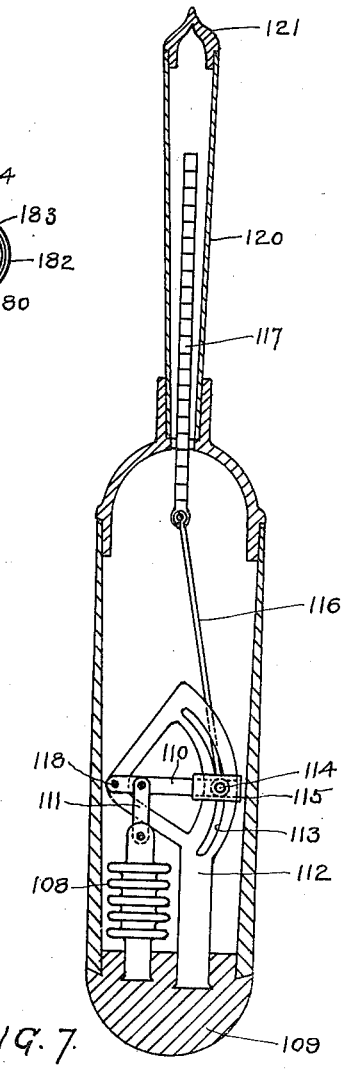

Figs. 5 and 6 show a further modification. In this case the bellows 35 acts on a pinion 37 which plays between a fixed rack 38 and a movable rack 39. The fixed rack is supported by an extension 40 of the arm 41 of the bellows support 42; and the movable rack is guided by guides 43 fixed to the extension 44 of the support arm 45. Fixed to the upper end of the rack 39 is the scale sheet 46 slidably mounted in the stem of the barrel 47. The expansion of the bellows, as the temperature of the liquid being tested changes, acts on the scale sheet through the pinion and the movable rack so that the motion of the upper end of the bellows is materially magnified. Preferably the bellows in this case, as with the other cases, is filled with liquid having substantially the same coefficient of expansion as the liquid to be tested; but liquids or gases having other coefficients can be used if desired.

Fig. 7 illustrates a hydrometer which has compensating means comprising a thermostatic bellows 108. The bellows has its lower end anchored in the ballast 109 and is arranged to operate a lever 110 by means of a link 111. The lever is pivoted to the frame 112. This frame has a slot 113 in which plays a pin 114. The pin also plays in a slot 115 formed in the end of the lever 110.

In operation, if the liquid being tested is hotter than normal, the thermostat as it warms will elevate the free end of the lever, and this in turn, by means of the pin 114 and the link 116, will elevate the scale 117. As the slot 113 is not concentric with the lever, the vertical movement of the pin will not correspond with the vertical movement of the free end of the lever. By properly forming the curvature of the slot with reference to the pivot 118, the movement of the scale may be such as to compensate for irregularities in its movement which otherwise would be caused by the varying temperature of the liquid under test, so that the correct density of the liquid will be indicated at all temperatures.

With ordinary constant-weight hydrometers, the distance between the graduations on the scales, in terms of density, are less as the density of the liquid being tested increases; the lines are crowded together as the density readings increase. By using a tapering stem 120, with the diameter decreasing with increasing density, and at the proper rate, equally spaced scale divisions may be used. It is difficult to get close duplicates of tapering stems made from ordinary glass; but if they are made of transparent organic or synthetic glass, very close uniformity of product can be obtained. Hence, for hydrometer stems of the type shown in Fig. 7, I prefer to form them of plastic materials, such as synthetic glasses suiting the needs.

Also in this type I provide a plug 121 which is sealed in the upper end of the stem. Such plugs assist in assembling and calibrating the hydrometers, and particularly in inserting the proper amount of ballast.

Figs. 8 to 10 illustrate a modified form in which the temperature variations are compensated for by a thermostatic bellows. A frame 180 is hung, when the hydrometer is immersed, by a hooked wire 181. This frame is preferably formed of sheet metal with the edge 182 bent over on the main portion so as to form an enclosure 183 in which is mounted the thermostatic bellows 184, which is firmly fixed to a flange 185 of the support. Rotatably mounted in the support is a pin 186. Fixed to the pin is a scale sheet 187, and also fixed to the pin is a pinion 188 which meshes with the rack 189. And pivoted to the pin is a buoyant hand vane 190.

In operation, when the hydrometer is immersed in the liquid to be tested, normally the bellows, by means of the rack and pinion, holds the scale about in the position shown. At the same time the buoyant force of the liquid will force the vane upwards to near the central portion of the scale 191, and the scale indication will correspond to the normal density of the liquid. If the temperature of the liquid is above or below normal, the bellows will expand or contract, as the case may be, and in doing so will raise or lower the scale sufficiently to compensate for the temperature effect and will thus give the correct density reading.

I claim as my invention:

1. In a hydrometer, means for indicating the density of a liquid at a given normal temperature, and means responsive to varying temperatures of the liquid for maintaining substantially constant the indications of said indicating means, said responsive means comprising a thermostatic bellows, and means operatively connecting the bellows with the indicating means.

2. In a hydrometer as claimed in claim 1, in which said connecting means are arranged to magnify the movements of the indicating means relative to the movement of the bellows.

3. In a hydrometer as claimed in claim 1, in which said connecting means are arranged to magnify the movements of the indicating means relative to the movement of the bellows, and in which said connecting means are arranged to impart non-proportional movement of the indicating means relative to the movement of the bellows.

4. In a hydrometer as claimed in claim 1, including a support for the bellows, and said connecting means comprising a rack element and a gear element, one of the elements being connected to the bellows and the other element being connected with the indicating means.

5. In a hydrometer as claimed in claim 1, including a support for the bellows, and said connecting means comprising a rack element and a gear element, one of the elements being connected to the bellows and the other element being connected with the indicating means, said indicating means comprising a scale pivoted to the support, and a pointer for the scale pivoted to the support, and said connecting means operatively connecting the bellows with the scale, the pointer being buoyant.

6. A hydrometer comprising a sealed tube, a scale movably mounted in the tube and adapted to indicate the depth to which the tube sinks when immersed in a liquid the density of which is to be determined, and a thermostatic bellows, responsive to the temperature variations of the liquid, operatively connected with the scale, and mounted in and fixed to the tube.

7. In a hydrometer as claimed in claim 1, in which said connecting means are arranged to magnify the movements of the indicating means relative to the movement of the bellows, including a support having a slot therein, a member slidably mounted in the slot, the operatively connecting means comprising means operatively connecting one element of the indicating means with the slidable member, one portion of the bellows being fixed relatively to the support and another portion thereof being operatively connected with the slidable member.

8. In a hydrometer as claimed in claim 1, in which said connecting means are arranged to magnify the movements of the indicating means relative to the movement of the bellows, including a support having a slot therein, a member slidably mounted in the slot, the operatively connecting means comprising means operatively connecting one element of the indicating means with the slidable member, one portion of the bellows being fixed relatively to the support and the free portion being pivotally connected with an arm, the arm being pivoted to the support and being operatively connected with the member, the slot being eccentric with reference to the arm pivot.

CHARLES E. LINEBARGER.